April 9, 1963
A. W. SEAVEY
3,084,852
FAN BLADE HUB CONNECTOR
Filed March 29, 1961
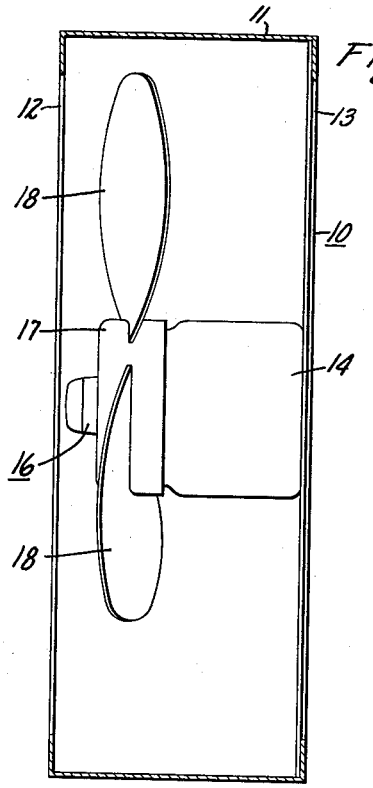
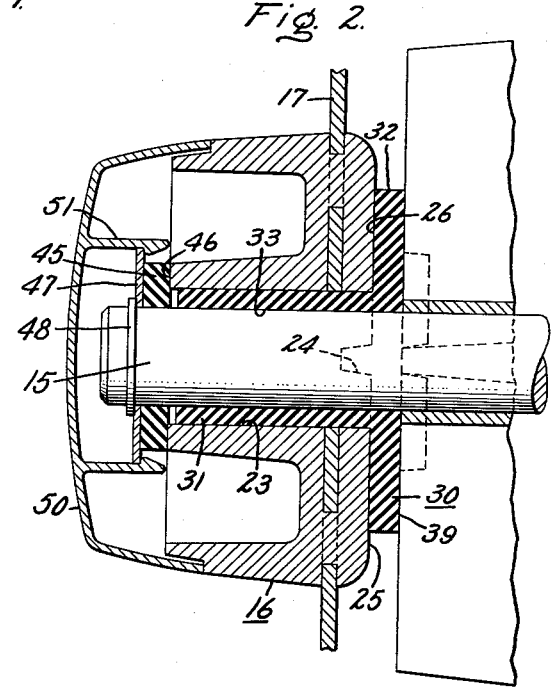
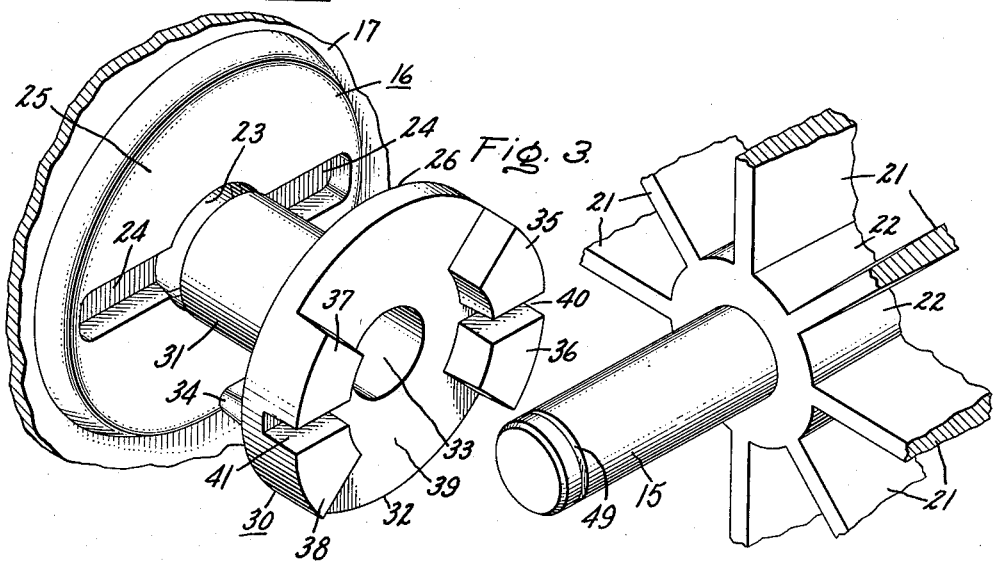
Inventor:
Alton W. Seavey,
by Bernard J. Platt
His Attorney.

United States Patent Office 3,084,852
Patented Apr. 9, 1963

3,084,852
FAN BLADE HUB CONNECTOR
Alton W. Seavey, Nichols, Conn., assignor to General Electric Company, a corporation of New York
Filed Mar. 29, 1961, Ser. No. 99,113
7 Claims. (Cl. 230—272)

This invention relates to a hub connector between a driving shaft and a driven hub mounted on the shaft and, more particularly, to a resilient hub connector especially suitable for rotating fan applications.

Rigid connectors such as set-screws, keys, metallic bushings, and other similiar devices have been used in the past to secure hubs to driving shafts. Various types of resilient connectors have also been used in the past for mounting hubs. When a rigid connector is used, the rigid joint between the driving shaft and the hub may readily transmit vibrations between the shaft and the hub. The vibrations which may be transmitted through a rigid connection may become particularly troublesome in fan arrangements in which the fan blade hub is directly mounted to the drive shaft of an electric motor. In such an arrangement, motor vibrations may be transmitted through the rigid connector to cause noisy fan operation. Eccentricity of balance of the fan blades mounted on a rigid connector may also cause undesirable vibrations since the rigid connector will prevent the fan from positioning itself on the shaft during fan operation to compensate for the unbalance. In addition to causing noisy fan operation, continual vibrations through a rigid connector may in time cause material fatigue and consequent failure of the hub or fan blade elements.

Resilient connectors may be used to reduce vibration transmission between a shaft and a hub mounted thereon. When used to mount a fan blade on a driving shaft, a resilient connector will generally reduce the noise of fan operation by damping vibration and allowing the fan blade to position itself on the shaft so as to compensate for fan unbalance. Resilient connectors generally transmit the driving torque from the shaft to the hub through frictional engagement with both the shaft and the hub. Such resilient connectors which depend entirely upon frictional engagement to transmit torque frequently display a tendency to slip with respect to the hub and shaft, thereby failing to positively transmit torque from the shaft to the hub.

It is therefore a principal object of this invention to provide an improved connector for joining a driving shaft and a hub.

Another object is to provide a resilient connector which transmits the driving torque from the shaft to the hub without slipping with respect to either the shaft or the hub.

Yet another object of the invention is to provide an improved connector between a hub and a driving shaft which will dampen vibrations.

A further object is to provide a connector which will allow alignment of a fan hub on a driving shaft when the fan is in operation to compensate for unbalance of the fan.

A still further object is to provide an improved connection which is inexpensive and easy to manufacture, install, and replace.

Briefly stated, in accordance with one embodiment of the invention, a resilient connector is compressed between a hub and a driving shaft to provide vibration damping. Additionally, interlocking means are provided between the shaft and the connector and between the connector and the hub to assure positive power transmission from the shaft to the hub.

While the specification concludes with claims particularly pointing out and distinctly claiming the subject matter of this invention, it is believed that this invention will be better understood from the following description taken in connection with the acompanying drawings which discloses one specific embodiment of this invention in which:

FIG. 1 is a view, partly in section, of a fan in which the resilient connector of this invention may be utilized;

FIG. 2 is a cross-sectional detail view of the hub assembly, including the resilient connector of this invention, for the fan shown in FIG. 1; and FIG. 3 is an exploded perspective view of the fan hub assembly and the resilient connector shown in FIG. 2.

Referring first to FIG. 1, a direct drive fan 10 is shown positioned within a protective housing 11 having suitable openings 12 and 13 on the front and the back sides of the housing 11. If desired, the openings 12 and 13 may be covered with a protective covering such as a wire grill which will permit air to flow through the openings. An electric motor 14 is mounted within the protective housing 11, the motor 14 being positioned substantially coaxially with the openings 12 and 13. A drive shaft 15, as best shown in FIGS. 2 and 3, projects axially from one end of the electric motor 14 and is resiliently secured by connecting means which will presently be described in detail to a fan hub 16 for transmitting the torque from the shaft 15 to the hub 16. Referring again to FIG. 1, a blade carrier 17 is secured to the outer periphery of the hub 16 and a plurality of fan blades 18 are secured thereto. It will be understood that a complete fan assembly will include supporting means for positioning the electric motor 14 within the protective housing 11 and bearings for supporting the drive shaft 15. These features, along with other design details forming no part of this invention, have not been shown.

Referring now to FIGS. 2 and 3, the drive shaft 15, generally a cylindrical shaft of a rigid material such as steel, extends axially a short distance beyond a plurality of cooling fins 21, also of a rigid material such as metal, which are rigidly secured to the shaft 15 and project radially outward therefrom. The cooling fins 21, positioned adjacent the motor armature (not shown), draw cooling air through the motor 14. As best shown in FIG. 3, the cooling fins 21 define a plurality of V-shaped slots 22 between adjacent fins 21.

The fan blade hub 16 is, like the drive shaft 15, generally made of a rigid material such as, for example, metal or plastic. The particular hub shown in FIG. 2 may be formed of die cast metal, molded plastic or other suitable material. The hub 16 is provided with an axially extending bore 23 which is of somewhat greater diameter than the shaft 15; the particular relationship between the dimensions of the shaft 15 and the bore 23 will be specifically described at a later point in this description. As best shown in FIG. 3, a recess or groove 24 is provided in the face 25 of the hub 16 adjacent the cooling fins 21. The groove 24, which intersects the bore 23, preferably extends across substantially the entire face 25.

A bushing 30 composed of rubber or a similar resilient material may be inserted and compressed between the hub 16 and the drive shaft 15 when the hub and shaft are in the assembled position shown in FIG. 2. As shown in FIG. 3, the resilient bushing 30 is comprised of a tubular sleeve portion 31 and an outwardly extending flange portion 32 at one end of the bushing 30. The cylindrical sleeve 31 is dimensioned so that it has sufficient thickness to be compressed when assembled between the shaft 15 and bore 23 of hub 16. In other words, the outer diameter of the cylindrical sleeve 31 is preferably of slightly larger diameter than the bore 23 provided in the hub 16 and the axially extending bore 33 in the sleeve 31 is approximately the same diameter as the diameter of the drive shaft 15.

In assembly, the cylindrical sleeve 31 is preferably inserted into the bore 23 of the hub 16 to resiliently engage the bore 23. The hub 16 and the assembled bushing 30 are then pressed on the drive shaft 15 to resiliently mount the hub 16 on the drive shaft 15. The resilient connection between the drive shaft 15 and the hub 16 provided by the resilient bushing 30 efficiently damps vibrations which would otherwise be transmitted between the shaft and the hub. Also, the substantial friction forces which exist between the bushing 30 and both the drive shaft 15 and the hub 16 help to directly transmit the motor torque from the drive shaft 15 to the hub 16.

In order to assure that the torque from the drive shaft 15 is positively transmitted to the hub 16, the outwardly extending annular flange 32 at the end of the bushing 30 may be provided with a projection or ridge 34 extending across the face 26 of the flange adjacent the cylindrical sleeve 31. The ridge 34 is dimensioned so that it will fit within the groove 24 of the hub 16 when the bushing 30 is fully inserted into bore 23 of the hub 16. The interlocking of the groove 24 and the ridge 34 will prevent relative rotation between the bushing 30 and the hub 16 in either direction of rotation. Additionally, a plurality of projections 35, 36, 37 and 38 may extend axially from the face 39 on the other side of the flange 32. As shown in FIG. 3, these projections may be provided in pairs 35, 36 and 37, 38 oppositely positioned on the face 39. The projections 35 and 36 comprising one pair of projections are spaced so that a space 40 is formed therebetween, the space 40 being large enough to receive one of the cooling fins 21. A similar space 41 is formed between the projections 37 and 38. When the bushing 30 is compressed on the shaft 15 as shown in FIG. 2, two of the cooling fins 21 will fit into the spaces formed between the projections 35, 36 and 37, 38 of two pairs of projections. The interlocking engagement between the two cooling fins 21 and the pairs of projections will prevent relative rotation between the shaft 15 and the bushing 30 in either direction of rotation.

More particularly, as shown in FIG. 3, each of the projections 35, 36, 37, and 38 may have a generally V-shaped configuration so that it may fit into one of the V-shaped slots 22 defined between adjacent cooling fins 21. Thus, it will be seen that each projection will be contacted by the adjacent cooling fins 21, thereby preventing relative rotation between the shaft 15 and the bushing 30. It will, of course, also be apparent that a single V-shaped projection (not shown) may alternately be provided to fit into a space between two adjacent cooling fins 21, the interlocking arrangement of the single projection and the adjacent cooling fins 21 serving to prevent relative rotation between the drive shaft 15 and the bushing 30. Similarly, more than the four projections shown in FIG. 3 may be provided if desired and the projections may be arranged on the flange 32 in groups of more than two. It is possible to provide a plurality of projections entirely around the periphery of the flange 32 so that one of the projections fits into each of the V-shaped slots 22.

As shown in FIG. 2, the flange portion 32 of the resilient bushing 30 resiliently positions the hub 16 out of engagement with the cooling fins 21 which are ordinarily composed of steel or a similar rigid material. As pointed out previously, the cylindrical sleeve 31 of the bushing 30 resiliently positions the hub out of engagement with the drive shaft 15. In order to completely insulate the hub 16 from any direct contact with the drive shaft 15 or any rigid members secured to the drive shaft, a washer 45 of rubber or similar resilient material may be slipped over the end of the drive shaft 15 and positioned against the end 46 of the hub 16. In order to hold the resilient washer 45 on the drive shaft 15, a metallic washer 47 having slightly larger diameter than the resilient washer may be slipped over the end of the drive shaft 15. A snap ring 48 is provided for holding the metallic washer 47 on the drive shaft, the snap ring 48 fitting into a groove 49 on the end of the drive shaft 15. When assembled, the resilient washer 45 is compressed between the metallic washer 47 and the end 46 of the hub 16.

To complete the assembly, a decorative cover 50 having an axially extending sleeve 51 may be slipped over the end of the hub and shaft assembly. The end of the sleeve 51 snaps over the metallic washer 42 to hold the cover 50 in place.

It can thus be seen that this invention provides a connection for connecting a drive shaft to a hub which will positively transmit the torque from the drive shaft to the hub without any slippage and, in addition, provides a connection which will effectively damp any vibrations which may ordinarily pass between the hub and the shaft through a rigid connection.

While only one embodiment of this invention has been described in detail, it will be readily apparent that various modifications thereof may be made and it is intended to cover by the appended claims all such modifications as fall within the true spirit and scope of the invention.

What I claim is:

1. A hub assembly for a fan comprising, a drive shaft, a hub mounted on said shaft, a resilient bushing compressed between said shaft and said hub, an integral annular flange at an end of said bushing, a cooling fin secured to said shaft and extending outwardly therefrom adjacent said flange, first and second axially extending projections on said flange interlocking with said cooling fin to prevent relative rotation between said shaft and said bushing, a groove in the face of said hub adjacent said flange, a ridge on said flange extending into said groove to prevent relative rotation between said bushing and said hub, the bushing thereby being interlocked with said shaft and said hub to prevent relative rotation therebetween.

2. A hub assembly for a fan comprising a drive shaft, a hub mounted on said shaft, a resilient bushing compressed between said shaft and said hub, an integral annular flange at an end of said bushing, a plurality of cooling fins secured about the periphery of said shaft and extending outwardly therefrom adjacent said flange, an axially extending interlocking projection on said flange positioned between two of said cooling fins to prevent relative rotation between said shaft and said bushing, a groove in the face of said hub adjacent said flange, a ridge on said flange interlocking with said groove to prevent relative rotation between said bushing and said hub, the bushing thereby being interlocked with said shaft and said hub to prevent relative rotation therebetween.

3. A hub assembly for a fan comprising, a drive shaft, a hub mounted on said shaft, a resilient bushing compressed between said shaft and said hub, an integral annular resilient flange at an end of said bushing, a first side of said flange resiliently engaging a first face of said hub, a washer resiliently engaging a second face of said hub, a cooling fin secured to said shaft and extending outwardly therefrom, a second side of said flange resiliently engaging said cooling fin, first and second axially extending projections on the second side of said flange interlocking with said cooling fin to prevent relative rotation between said shaft and said bushing, a groove in the first face of said hub, a ridge on the first side of said flange interlocking with said groove to prevent relative rotation between said bushing and said hub, the bushing thereby being interlocking with said shaft and said hub to prevent relative rotation between said shaft and said hub.

4. A hub assembly comprising a rigid hub having a recess therein, a rigid shaft having a plurality of radially extending cooling fins mounted thereon, a resilient bushing for coupling said hub to said shaft, said bushing comprising a cylindrical sleeve of resilient material having sufficient thickness to be compressed when assembled between said shaft and said hub and an integral flange at one end of said bushing, first and second projections on said flange interlocking with one of said cooling fins on said shaft to prevent relative rotation between said shaft and said bushing, a third projection on said flange interlocking with said recess in said hub to prevent relative rotation between said bushing and said hub, the bushing thereby being interlocked with said shaft and said hub to prevent relative rotation therebetween.

5. A hub assembly comprising a rigid hub having a groove therein, a rigid shaft having a plurality of radially extending cooling fins mounted thereon, a resilient bushing for coupling said hub to said shaft, said bushing comprising a cylindrical sleeve of resilient material having sufficient thickness to be compressed when assembled between said shaft and said hub and an integral flange at one end of said bushing, an axially extending interlocking projection on said flange positioned between two adjacent cooling fins on said shaft to prevent relative rotation between said shaft and said bushing, a ridge on said flange interlocking with said groove in said hub to prevent relative rotation between said bushing and said hub, the bushing thereby being interlocked with said shaft and said hub to prevent relative rotation therebetween.

6. A fan hub assembly comprising: a generally cylindrical metallic drive shaft, a plurality of metallic members connected to said shaft extending generally radially outwardly therefrom, a fan blade hub having a centrally located generally cylindrical bore for receiving said shaft, a resilient bushing for drivingly connecting said shaft and said metallic members to said hub, said bushing comprising a cylindrical sleeve of resilient material compressed between the outer surface of said cylindrical shaft and said bore, an annular flange integrally formed with said bushing extending outwardly from one end of said cylindrical sleeve, a first resilient projection integrally formed on said annular flange, said projection being spaced radially outwardly from the cylindrical sleeve portion of said bushing and being axially extending from the outer face surface of said flange, said first projection being inserted between two of said metallic members, a groove formed in an outer surface of said fan blade hub, a second resilient projection integrally formed on said annular flange, said second projection extending radially outwardly from said cylindrical sleeve and axially from the inner face surface of said flange, said second projection being inserted within said groove whereby a driving connection is provided from the radially extending metallic members to said first resilient projection and through said second resilient projection to the hub.

7. A fan hub assembly comprising: a generally cylindrical metallic drive shaft, a plurality of metallic cooling fins connected to said shaft and extending generally radially outwardly therefrom, a fan blade hub, a resilient bushing for drivingly connecting said shaft and said cooling fins to said hub, said bushing comprising a cylindrical sleeve of resilient material positioned in contact with said hub, means connecting said bushing in driving relation with said hub, a resilient projection integrally formed on said resilient bushing, said projection being spaced radially outwardly from the axis of the cylindrical sleeve portion of said bushing, and said projection being inserted between two of said cooling fins to provide a driving connection from said cooling fins to said resilient bushing and to the fan blade hub.

References Cited in the file of this patent
UNITED STATES PATENTS

| | | |
|---|---|---|
| Re. 20,285 | Hurxtwal | Mar. 9, 1937 |
| 1,909,885 | Ogden | May 16, 1933 |
| 2,032,900 | Alger | Mar. 3, 1936 |
| 2,164,485 | Yantis | July 4, 1939 |
| 2,262,695 | Moeller | Nov. 11, 1941 |
| 2,360,149 | Moser | Oct. 10, 1944 |
| 2,469,116 | Kiekhaefer | May 3, 1949 |
| 2,558,589 | Skolfield | June 26, 1951 |
| 2,680,559 | Morrill | June 8, 1954 |
| 2,713,970 | Kueser | July 26, 1955 |